April 14, 1953     N. N. ARASHIRO ET AL     2,634,846
CHANGE MAKING MACHINE
Filed June 24, 1947     10 Sheets-Sheet 5
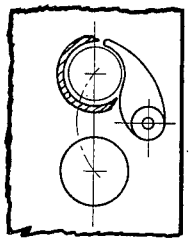
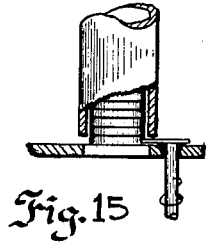
Fig. 15
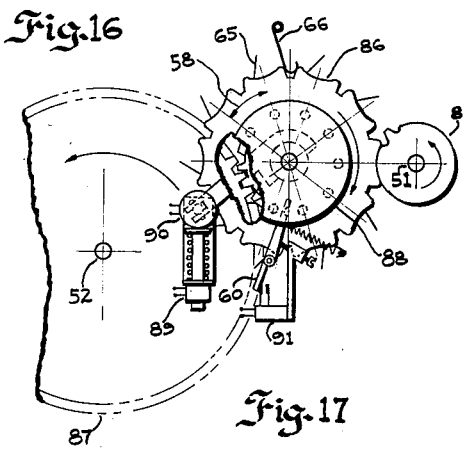
Fig. 16
Fig. 17
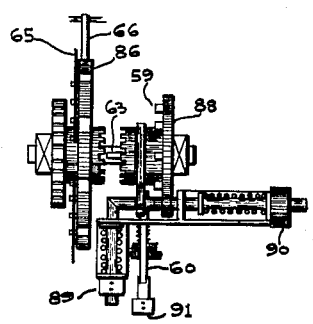
Fig. 18
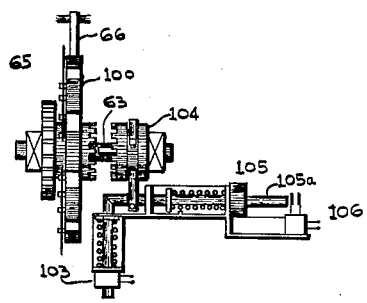
Fig. 20
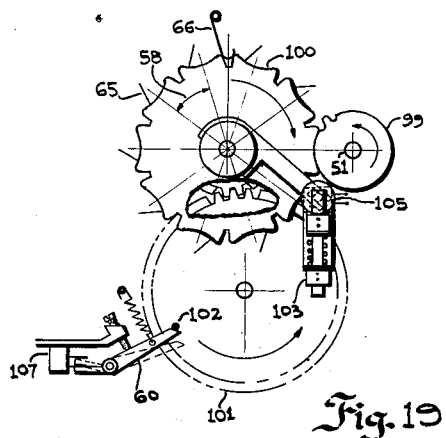
Fig. 19
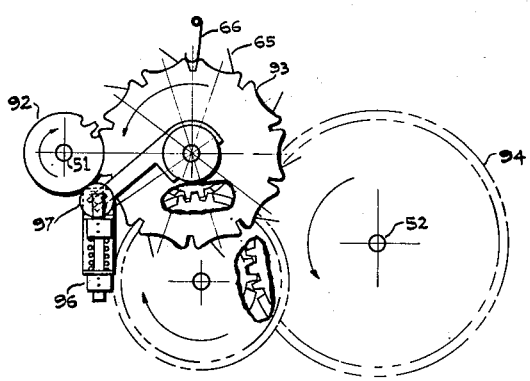
Fig. 21
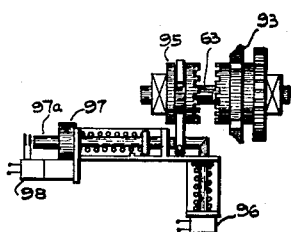
Fig. 22
Inventors:
Nicholas N. Arashiro
Fred R. Hamaishi
By Keit W. Worrell Atty.

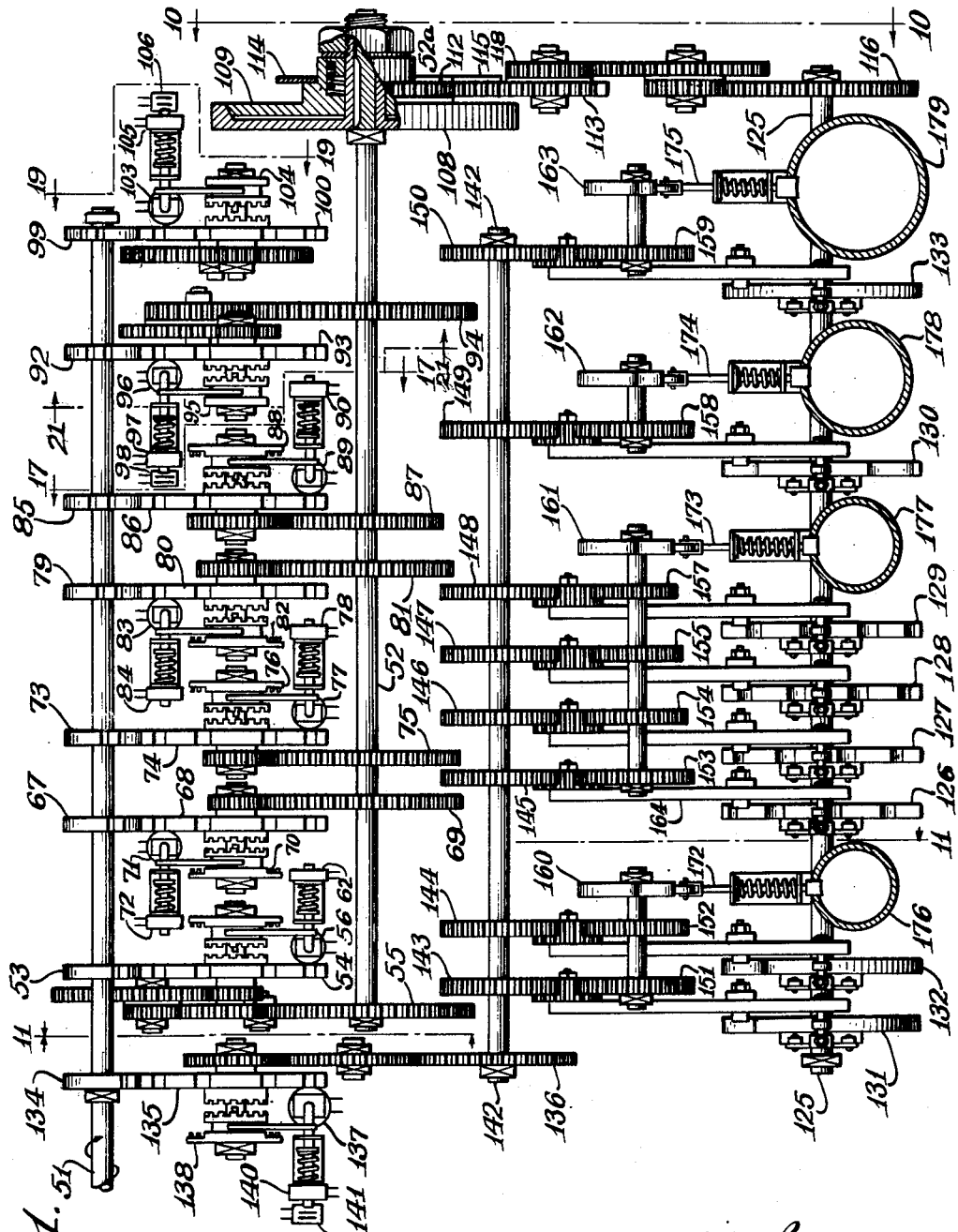

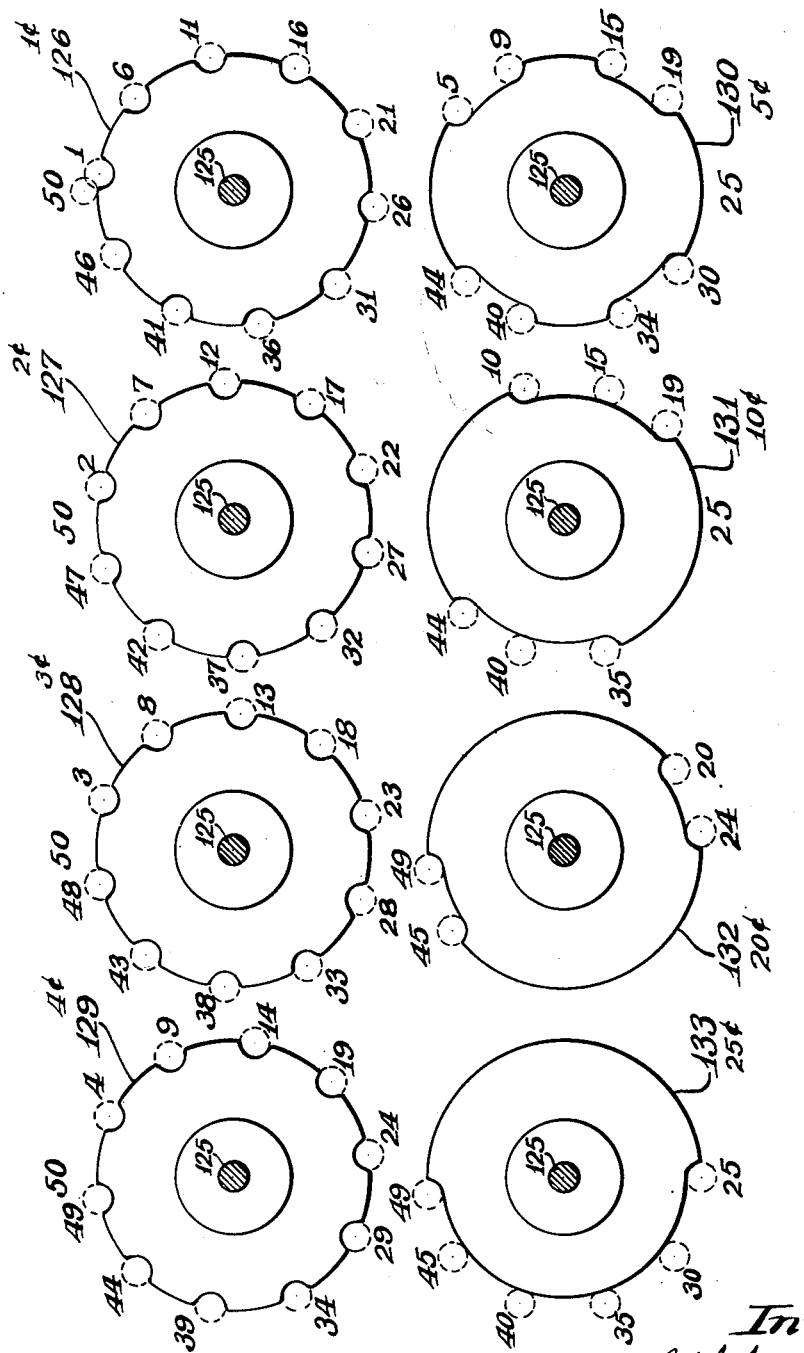

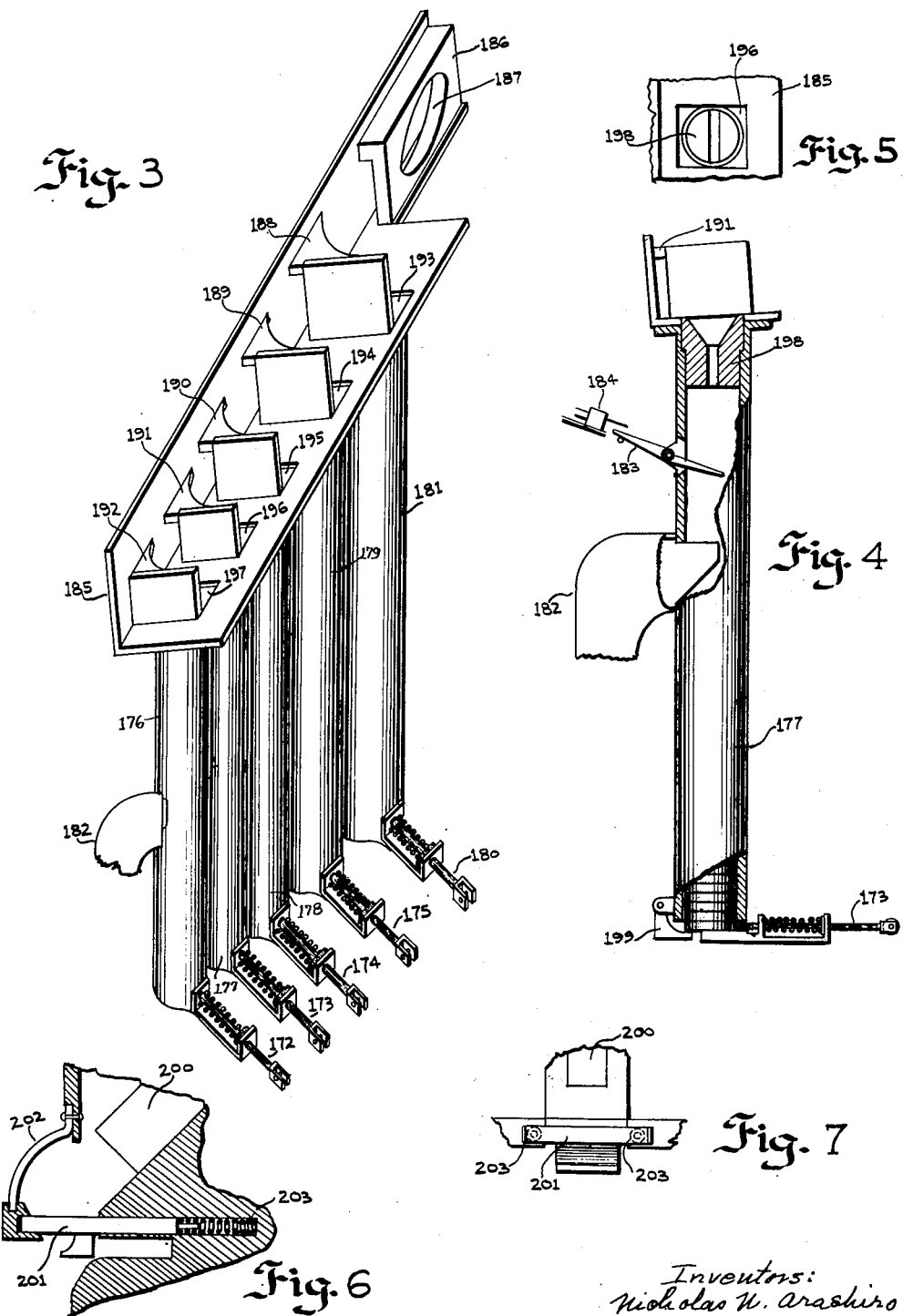

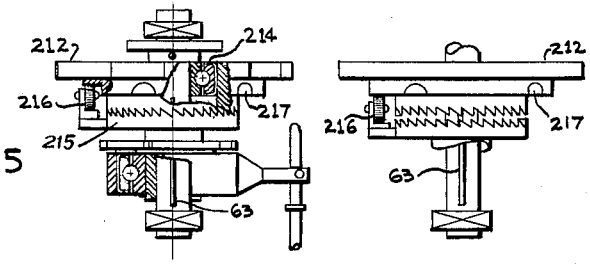
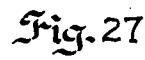
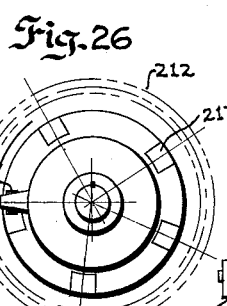
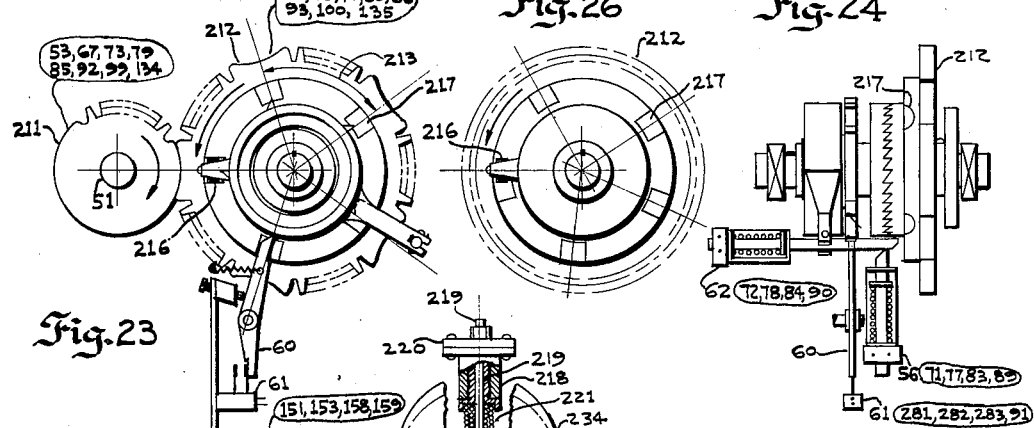
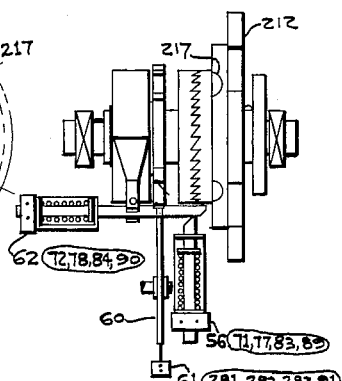
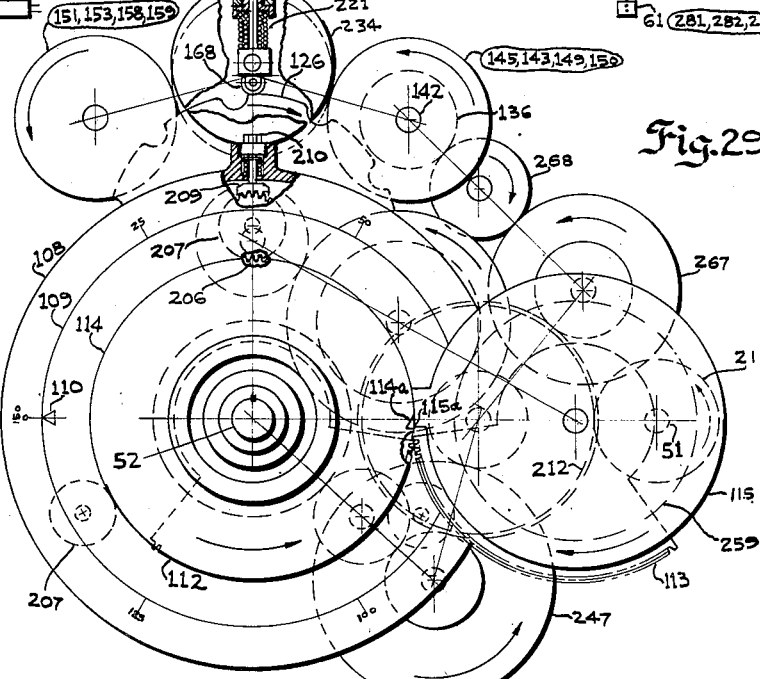
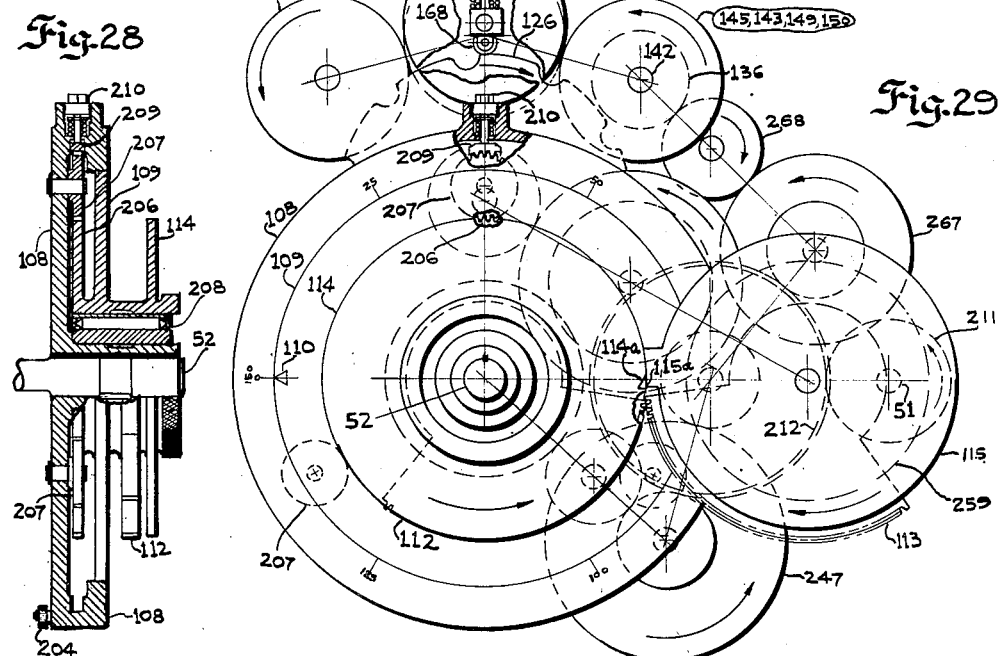

April 14, 1953 N. N. ARASHIRO ET AL 2,634,846
CHANGE MAKING MACHINE
Filed June 24, 1947 10 Sheets-Sheet 7
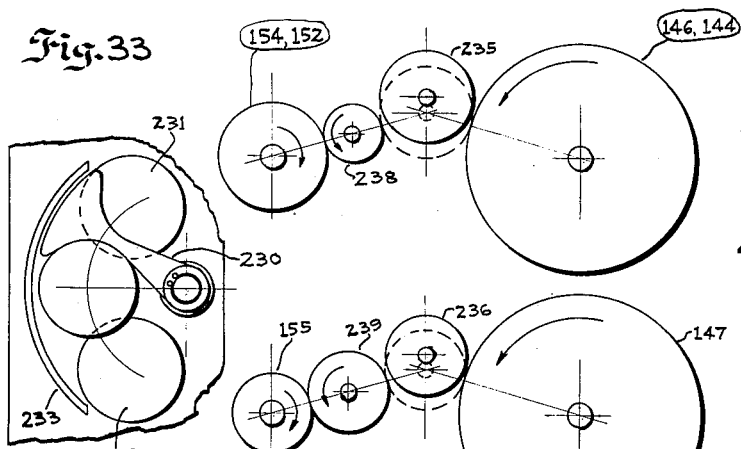
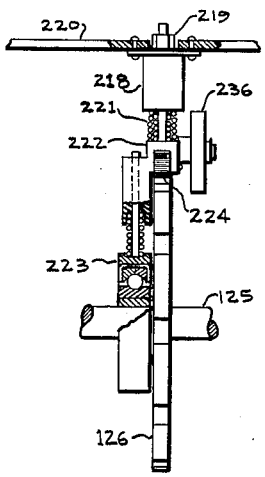
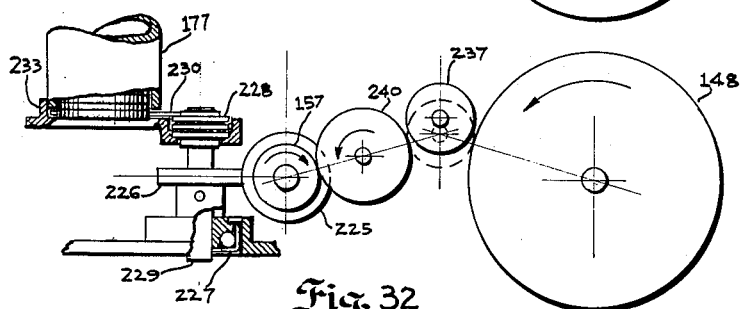
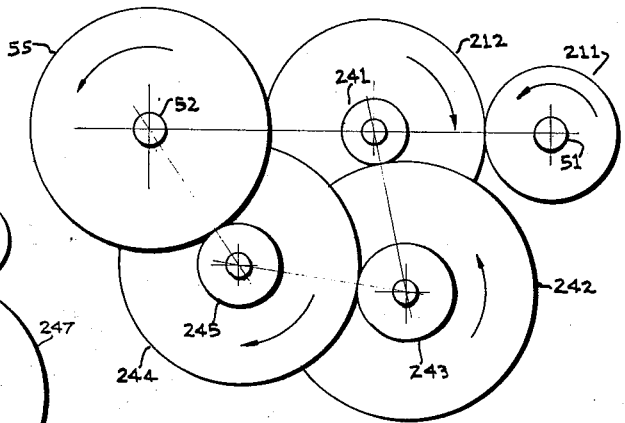
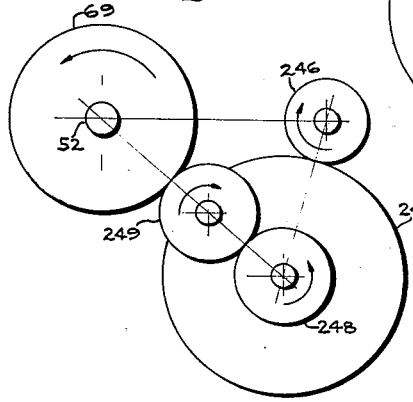
Inventors:
Nicholas N. Arashiro
Fred R. Hamaishi
By Kent W. Worrell Atty.

April 14, 1953 N. N. ARASHIRO ET AL 2,634,846
CHANGE MAKING MACHINE
Filed June 24, 1947 10 Sheets-Sheet 8

Inventors:
Nicholas N. Arashiro
Fred R. Hamaishi
By Kent W. Worrell Atty

April 14, 1953
N. N. ARASHIRO ET AL
2,634,846
CHANGE MAKING MACHINE
Filed June 24, 1947
10 Sheets-Sheet 10
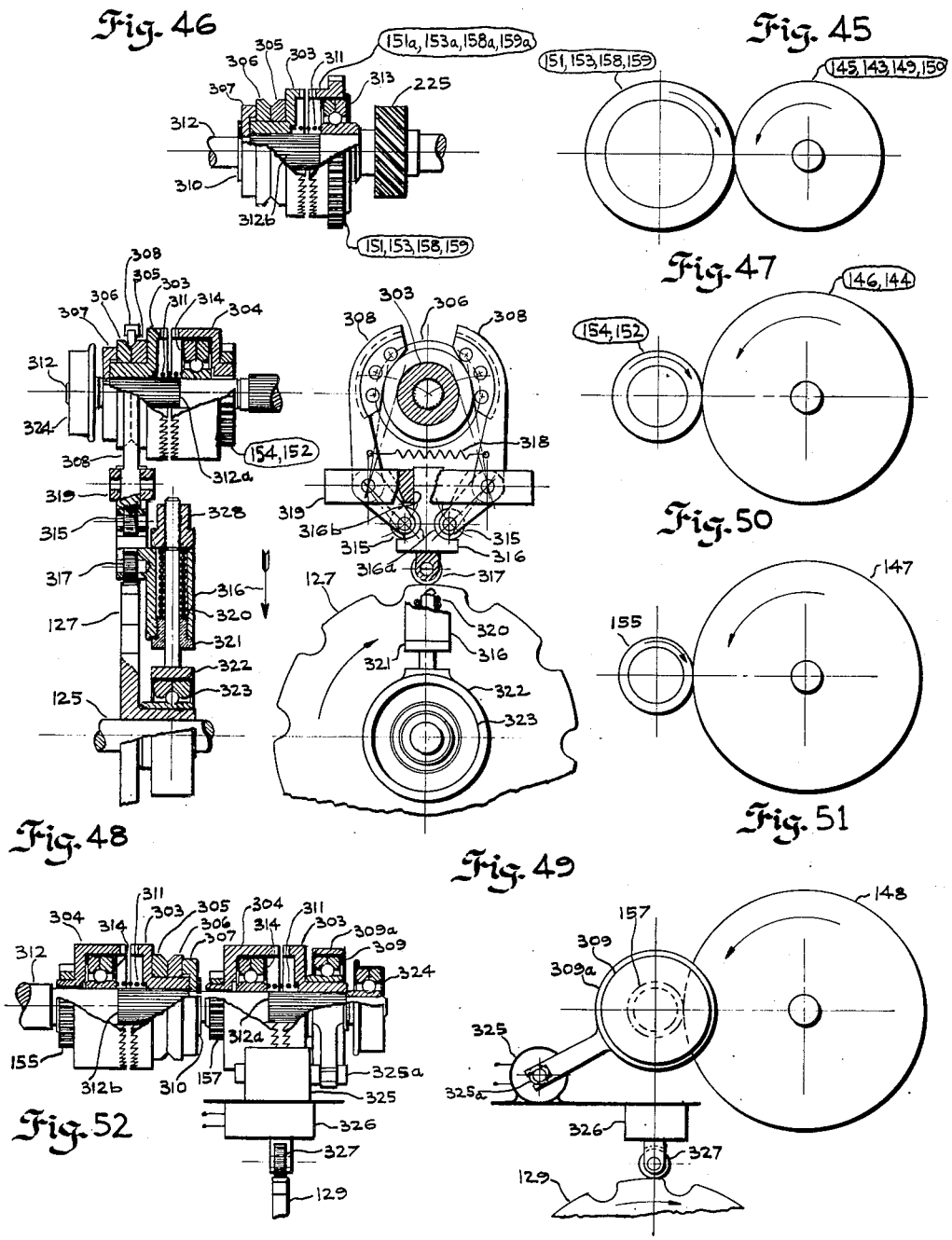
Inventors:
Nicholas N. Arashiro
Fred R. Hamaishi
By Kent W. Worrell Atty.

Patented Apr. 14, 1953

2,634,846

UNITED STATES PATENT OFFICE 2,634,846

CHANGE MAKING MACHINE

Nicholas N. Arashiro, Milwaukee, Wis., and
Fred R. Hamaishi, Chicago, Ill.

Application June 24, 1947, Serial No. 756,708

6 Claims. (Cl. 194—10)

This invention relates in general to a machine which will receive a coin or a number of different coins through a single admission slot, register them according to their values, and will automatically return the correct change for any total over and above any pre-set amount.

Coin vending machines commonly use a gravity system for receiving coins inserted in slots, or a push-pull lever to operate the mechanism and to deliver articles, change, messages, and the like. Or a manually operated machine using coin discharging means may operate upon one or more coin accumulators to deliver proper change to a receiver. The first two methods require coins of proper denominations to operate the machine, and the latter requires manual attention. These types lack versatility in the receipt of all denominations of coins and in failing automatically to return the right change.

Among the objects of this invention are: to receive coins of all denominations through one slot; to separate coins of different denominations according to their sizes; to register all coins inserted according to their values; to pre-set the amount to be received in payment and to select and return the proper coins for any over payment; to discharge or deliver an article, message and the like; to quickly and easily vary the pre-set amount without other alteration of the machine; and in general to provide the change making machine herein shown and described.

Other objects will appear in the specification and will be apparent from the accompanying drawings, in which, Fig. 1 is a plan view, somewhat diagrammatic, of an entire machine in accordance with this invention, with some of the parts in section;

Fig. 2 is a group view of the eight cams removed from Fig. 1 for developing the cumulative addition in combinatory sequence of inserted coins and controlling the change discharge of the difference between the inserted coin or coins and the pre-set on the master wheel;

Fig. 3 is a perspective view of the coin accumulator tubes shown in Fig. 1, free from the operating cams, but including the coin separator at the top of the tubes; which is represented as typical of a number of such sets in Fig. 1.

Fig. 4 is a side elevation with parts broken away and in section of one of the tubes in Fig. 3;

Fig. 5 is a top view of the tube shown in Fig. 4;

Fig. 6 is a sectional detail of a coin receiving receptacle;

Fig. 7 is a front view of the receptacle of Fig. 6 with the viewer removed;

Figure 8:
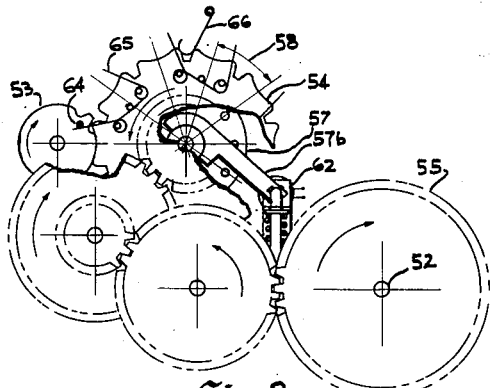
Figures 9, 9A:
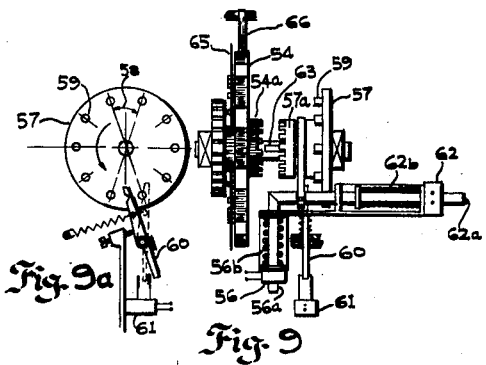
Figure 10:
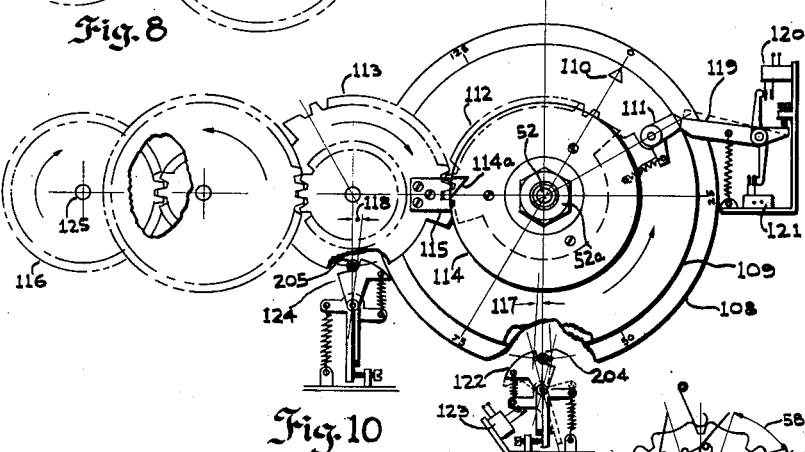
Figure 11:
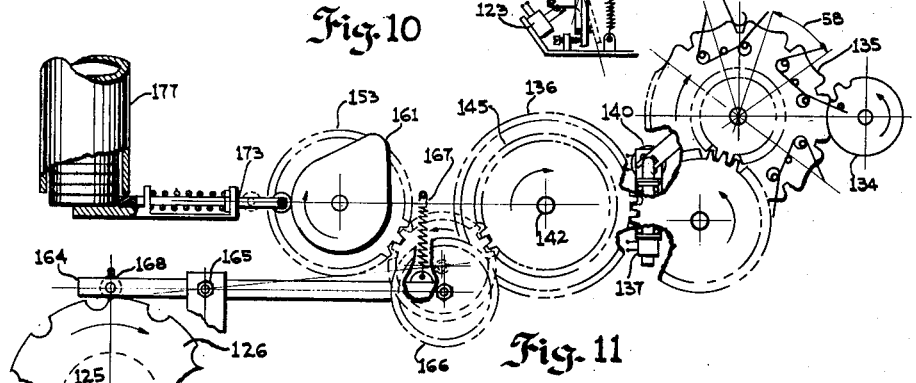
Figures 13, 14:
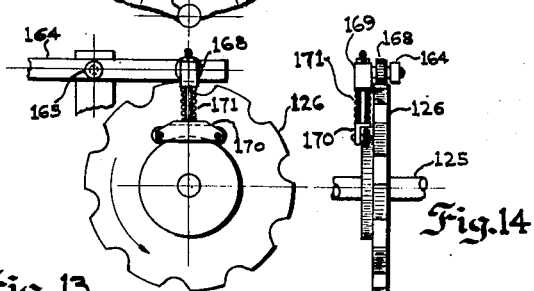
Figure 12:
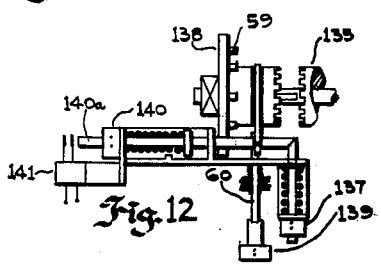
Figure 37:
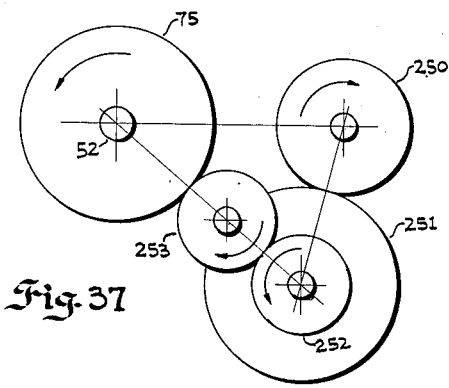
Figure 42:
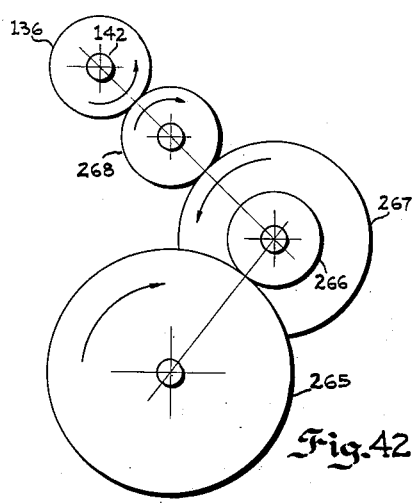
Figure 38:
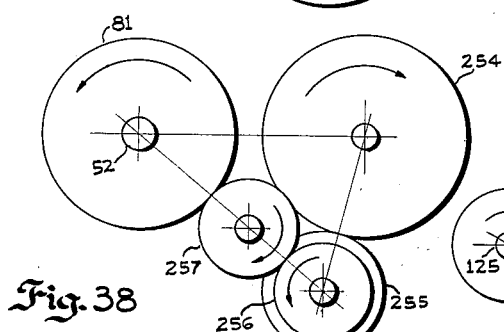
Figure 40:
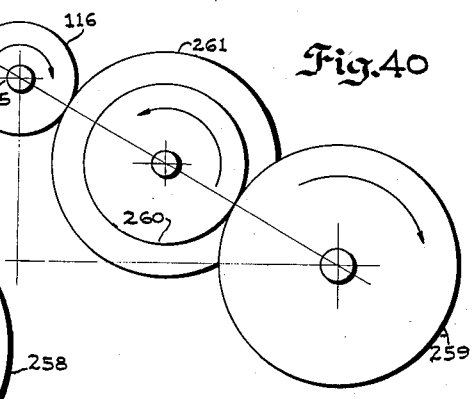
Figure 39:
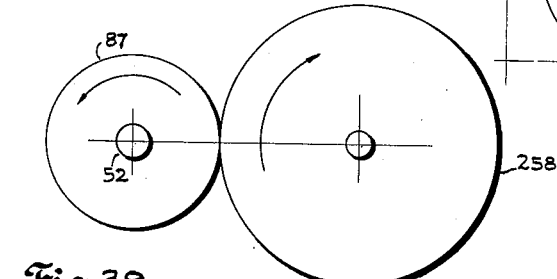
Figure 41:
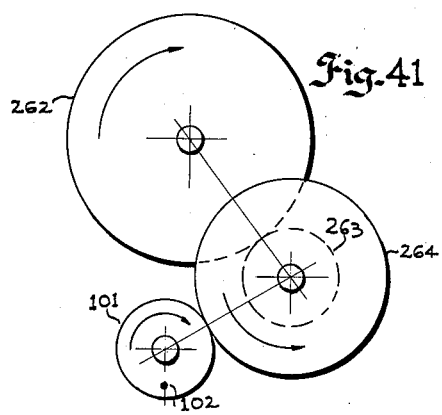
Figure 43:
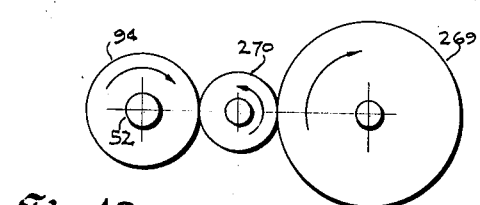
Figure 44:
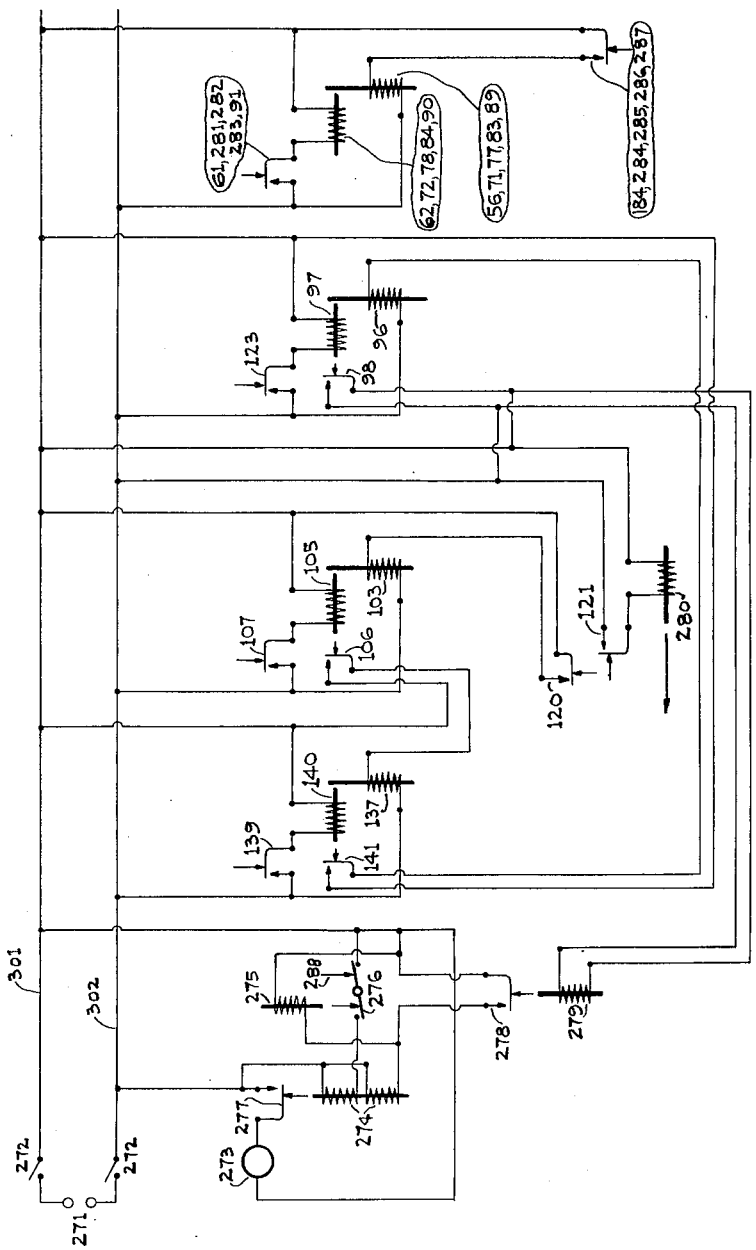

Fig. 8 is a side elevational view of the intermittent gear mechanism of Fig. 9 as taken approximately to the right of the line 11—11 of Fig. 1 past the shaft 52 and gear 55 looking in the direction of the arrows pointing to the right;

Fig. 9 is an elevational view of the intermittent gear mechanism of Fig. 8; Fig. 9a is a side elevation of clutch and contact means shown in Fig. 9;

Fig. 10 is a side elevational view taken on the line 10—10 of Fig. 1;

Fig. 11 is a side elevational view taken on the entire line 11—11 in the direction of arrows pointing to the left in Fig. 1;

Fig. 12 is an elevational view of the intermittent gear mechanism of Fig. 11;

Fig. 13 is a reverse side elevation of a portion of Fig. 11;

Fig. 14 is an elevational view of Fig. 13;

Fig. 15 is a modified coin expeller for the structure of Fig. 11;

Fig. 16 is a top view of the expeller of Fig. 15;

Fig. 17 is a side elevational view taken on the line 17—17 of Fig. 1;

Fig. 18 is an elevational view of intermittent gear mechanism of Fig. 17;

Fig. 19 is a side elevational view taken on the line 19—19 of Fig. 1;

Fig. 20 is an elevational view of intermittent gear mechanism of Fig. 19;

Fig. 21 is a side elevational view taken along the line 21—21 of Fig. 1;

Fig. 22 is an elevational view of intermittent gear mechanism of Fig. 21;

Fig. 23 is an elevational view of one of the intermittent gears;

Fig. 24 is an elevational view of a typical modified intermittent gear mechanism substituted in Fig. 23;

Fig. 25 is a top view of the modified intermittent gear of Fig. 23;

Fig. 26 shows another position of the structure of Fig. 23;

Fig. 27 is a top plan view of Fig. 26;

Fig. 28 is a sectional view of the master wheel shown in Fig. 29;

Fig. 29 is an elevational view of the master wheel with added gear trains showing the proper mounting and spacings of the various gears in ratios consistent with a given fixed center to center distance;

Fig. 30 is a partial elevational view of Fig. 29 for controlling the coin discharge for a gear ratio of 2 to 1;

Fig. 31 is a view similar to Fig. 30 showing a gear ratio of 3 to 1;

Fig. 32 is a view similar to that of Figs. 30 and 31 adding a coin expelling mechanism with a gear ratio of 4 to 1;

Fig. 33 is a plan view of the coin expelling mechanism of Fig. 32;

Fig. 34 is an elevational view showing parts of Fig. 29 and Fig. 31;

Fig. 35 is an elevational view representing a gear train not shown in Fig. 29 but consistent with the centers shown therein and a final gear train ratio of 1 to 30;

Fig. 36 is an elevational view representing a train of intermittent gears shown in Fig. 29 with the intermittent gears removed having a resultant gear train ratio of 1 to 6;

Fig. 37 is an elevational view similar to the preceding Fig. 36 for a given gear train ratio of 1/3;

Fig. 38 is an elevational view similar to the preceding Fig. 37 for a given gear train value of 5 to 6;

Fig. 39 is an elevational view of gears having a ratio of 5 to 3;

Fig. 40 is an elevational view of the driving gear train for the control discharge cam having a driving ratio of 3 to 1;

Fig. 41 is an elevational view of a timing gear similar to Fig. 19 having a driving ratio of 5 to 1;

Fig. 42 is an elevational view of one of the gear trains to transmit motion to the coin expelling mechanism;

Fig. 43 is an elevational view of the reversing gear train;

Fig. 44 is a diagrammatic plan view of an electrical circuit in accordance with this invention.

Fig. 45 is a diagrammatic view of expeller gears having a ratio of 1:1 for a fixed center to center distance;

Fig. 46 is a side elevation partly in section illustrating a modification of the clutch mechanism for operating expeller gears;

Fig. 47 is a diagrammatic view of expeller gears having a ratio of 2:1 for the same fixed center to center distance as shown in Fig. 45;

Fig. 48 is a sectional view of a modified form of clutch operating mechanism as shown in Fig. 29;

Fig. 49 is an elevational view with some of the parts in section of the structure shown in Fig. 48;

Fig. 50 is a diagrammatic view of expeller gears having a ratio of 3:1 and the same fixed center to center distance as shown in Fig. 45;

Fig. 51 is a side elevation somewhat diagrammatic of expeller gears having a ratio of 4:1 with fixed centers the same as in Fig. 45; and Fig. 52 is a side elevation of clutch mechanism partly in section combining the structures of Figs. 50 and 51, all of which is a modification of the structure shown in Fig. 29.

This invention will be described as it may be applied to a machine for receiving coins aggregating more than the cost of an article to be dispensed, for totalizing the coins received for discharging an article or articles for which payment has been made and also for returning any excess for the cost of the merchandise which is discharged or dispensed. The price paid for the merchandise may be varied but as herein applied, the amount of money which is required in payment for the merchandise is known in advance and this amount is set up upon a master wheel.

In setting up the mechanism for pre-setting the price on the master wheel for which the article, change, message, and the like is to be dispensed, reference is first made to Figs. 1 and 10 which shows master wheel 108 mounted upon a shaft 52. A plate 109 is coaxially mounted adjacent one side of the master wheel and carries a segment gear 112, a price indicator 110 in the form of a pointer, a trip dog 111 at the periphery and a plate 114 all attached to the plate 109. Engaging with segment gear 112 is a 1/3 segment gear 113 having a small toothed plate 115 and a roller 205 attached to the gear 113. A gear 118 is attached to the 1/3 segment gear 113 connected by a driving gear train terminating in gear 116 attached to a cam shaft 125.

A self-centering clip lever 124 engages roller 205 for zero positioning of the 1/3 segment gear, which is shown in its zero position with respect to the master wheel. A roller 204 is attached to the master wheel 108 and is adapted to engage clip lever 122 for actuating an electric switch relay 123 and also for normally positioning the master wheel 108.

The trip dog 111 engages a trip lever 119 at the side of the master wheel to actuate switch relays 120 and 121. To change or pre-set the price, it is necessary only to unscrew nut 52a at the end of the shaft 52 and to rotate the plate 109 in the direction opposite to the arrow shown in Fig. 10 positioning the indicator 110 at any price up to 99¢ according to the graduations in the periphery of the master wheel and then tighten the nut on the shaft, the plate 109 being held frictionally in contact with the master wheel 108 in any position in which it is set.

Referring now more particularly to the Fig. 29 modification of the master wheel structure shown by Fig. 10, the price indicator 110 of the plate 109 is rotated with respect to the calibrated figures on the master wheel 108 by first loosening a screw 210 at the top of the master wheel (see also Fig. 28) which disengages a segment gear 209 from a planetary gear 207 pivoted on the master wheel 108 to any price up to and including 99¢ for the differences in the amount of change inserted up to 49¢. The screw 210 is then tightened so that the segment gear locks the planetary gear 207 and another planetary gear 206 carried by the master wheel in the pre-set price position. The locking plate 114 is integral or secured to the 1/3 segment plate 112 and the plate 115 is secured to or integral with the 1/3 segment gear 113 with a locking notch 114a on the circular portion of the plate 114 in the locking circle in order to permit the corner 115a of the plate 115 which form the stop to pass to the plate 114 on the driving 1/3 segment gear at the ending of the period of rest and corresponding to the pre-set price position.

If the amount registered on the master wheel 108 relative to the pre-set price setting is over and above the pre-set price, the segment gears 112 and 113 engage, and thus transmit motion through gears 259, 260, 261 and 116 as shown in Fig. 40 to the controlled discharge cams of Fig. 2 on shaft 125 of the difference between the amount registered and the pre-set price.

The coin or any number of different coins are inserted through a single admission slot 187 of adaptor 186, Fig. 3. Coins of any denomination and in any order may be inserted which roll down a right angled plate 185 which may be inclined about 20° and in which the vertical web is tilted slightly from the vertical, approximately 5° to hold the coins uprightly in the angle of the plate. Deflector vanes and stoppers 188, 189, 190, 191 and 192 are arranged in descending order upon the angle plate and correspond to the diameters of a half dollar, quarter, nickel, penny and dime respectively, all but the last stop being spaced from the vertical web and the last stop extending to the vertical web. In the bottom web above each stop are corresponding holes 193, 194, 195, 196 and 197 for receiving coins in the order named.

Below each hole are coin accumulator tubes 176, 177, 178, 179 and 181 for receiving the coins named in the order of their ascending sizes. In Figs. 4 and 5, a coin entering the accumulator tube 177, passes through hole 196 in the angle plate 185 and engages an adaptor guide 198 having an opening with inclined sides at the top and a slot at the bottom for directing a coin to fall therein in one way only on to a lever 183 pivoted in the side wall of the tube 177 and adapted to actuate a relay switch 184. As coins accumulate in each tube, an overflow gravity chute 182 is provided at one side of the tube at a distance from the bottom so that when the coins in the tube reach that high, they will be discharged by gravity through the chute 182 into a common accumulator box located below the tubes but not shown in the drawings.

When any coin is inserted through admission slot 187 (Fig. 3), it depresses a switch button 288 (not shown in Fig. 3) in the slot, for controlling a maintained contact switch 276 (see Fig. 44) preferably located on angle plate 185 within the adaptor 186. A push-pull solenoid 274 is energized to close a snap-action switch 277 which closes an electric starting circuit from supply mains 301, 302 through a motor 273. This motor continues to drive motor shaft 51 (Fig. 1) until the motor circuit is opened by solenoid 274 as hereafter described. The supply mains may have separate switches 272 connecting them with a suitable source of current supply 271.

Each of the accumulator tubes is provided with a relay switch of which switch 184 in connection with tube 177 is typical, adapted to energize a solenoid 56 as in Figs. 1 and 44, which is shown in Fig. 24. Clutch mechanism (Figs. 25 and 27) is in an engaging position, due to spring tension, with a roller 216 riding on the face between slots 217 as shown in Figs. 26 and 27. Further rotation of intermittent gears 211 and 212 (Fig. 23) causes the clutch and roller to remain in engagement (Figs. 23, 24 and 25). Figs. 23, 24 and 25 show a typical arrangement of an intermittent gear 212 and a driving gear 211 which are intended to represent any one of the pairs of similar gears in Fig. 1 as 53, 54; 67, 68; 73, 74; 79, 80; 85, 86; 92, 93; 99, 100; and 134, 135.

For one rotation of intermittent gear 211, intermittent gear 212 will be rotated 1/5 of a revolution, an angular amount indicated by double arrow 213 in Fig. 23. This motion is transmitted through a gear train shown diagrammatically in Fig. 35 and consisting of gear 211 on motor shaft 51 which meshes with gear 212, and thence through reduction gears 241, 242, 243, 244, 245, and 55 mounted on shaft 52 on which the master wheel 108 is mounted. Since this coin tube 177 is for pennies and the master wheel 108 has one hundred fifty (150) graduations, each penny making a contact with the relay switch 184 causes 1/150 of a movement, or one unit of the master wheel calibrated dial face of the master wheel 108 (Figs. 1 and 29).

An example of the intermittent gear mechanism, for the one cent registration, is shown in Figs. 8, 9, and 9a, which comprises a jaw toothed clutch 57 in disengaged position. It slides on a keyed shaft 63 and has a toothed position 57a for engaging a toothed portion 54a of intermittent gear 54. A yoke bar 57b is secured to the movable bar 62a of solenoid 62 and engages the clutch 57 for moving it into and out of engagement. A spring 62b surrounding the bar 62a tends to engage the clutch and solenoid 62 pulls it out of such engagement. Solenoid 56 and its bar 56a are at right angles to bar 62a and the extremities of bars 56a and 62a are beveled and engage at a right angle. A spring 56b surrounding bar 56a projects the end of bar 56a into the path of bar 62a and holds bar 62a and clutch 57 out of engaging position. When solenoid 56 is energized, it pulls its bar 56a free from the end of bar 62a allowing spring 62b to engage toothed portions 57a and 54a.

Pins 59 project from clutch 57 adapted to engage a spring lever 60 mounted at one side or below it, the lever operating a relay switch 61 for operating a solenoid 62 (see Fig. 44).

To cushion the shock of movement between intermittent gears, as 53 and 54, a pin 64 is located on gear 53 near its single tooth, and a torsional spring 65 is attached to adjacent pins projecting from gear 54 with the extremities of the springs extending outwardly to engage the pin 64 as gear 53 moves into and out of engagement with gear 54. A spring 66 fixed at one end outside of the periphery of gear 54 has a rounded extremity at the other end adapted to engage in the notches of the gear 54 for holding it in proper spaced positions.

At the end of this 1/5 of a rotation of the intermittent gear mechanism, the spring lever 60 (Figs. 23, 24 and 25) is actuated by the cam of clutch 215 which closes relay switch 61 to energize solenoid 62 (see also Fig. 44) and to disengage clutch mechanism 215. The disengaged position is shown in Fig. 9.

In a similar manner and procedure, coins of different denominations, dimes, nickels, quarters and half-dollars are registered in their proper units on the master wheel when inserted in the slot 187, and directed into their proper coin tubes 176, 178, 179, and 181 respectively. Relay switches and the relays operated thereby, corresponding to switch 184 of 1-cent tube 177, and switch mechanism and solenoids for such operations, are not shown nor described in detail, and connections for them on the wiring diagram, Fig. 44, would only be in multiple with the solenoids 56 and 62.

Referring to Fig. 35, the centers therein shown are consistent with the composite view of the driving gear arrangement shown in Fig. 29 in which the engagement of intermittent gears 211 and 212 cause a rotation of the master wheel shaft 52, 1/150 of a revolution corresponding to a valuation of 1 cent. This gear train value is obtained in the following manner: Gears 241 to 242 have a ratio of 1/4; gears 243 to 244 have a ratio of 2/5; gears 245 to 55 have a ratio of 1/3. This results in a gear train value of $$1/4 \times 2/5 \times 1/3 = 1/30$$

or 1 unit on the master wheel. That is:

train value =

$$\frac{\text{angular velocity of driven}}{\text{angular velocity of driver}} = \frac{1/150}{1/5} = \frac{5}{150} = \frac{1}{30}$$

for one cent.

In a similar manner, Fig. 36 shows the angular rotation of gear 69 on the master wheel shaft 52 from gear 246 which has a driving ratio with gear 247 of 1/3; gear 248 has a driving ratio through idler gear 249 with gear 69 of 1/2 resulting in a gear train value of 1/3×1/2 which = 1/6 of the master wheel movement corresponding to a valuation of 5 cents. That is:

$$\text{train value} = \frac{5/150}{1/5} = \frac{5 \times 5}{150} = \frac{1}{6}$$

for 5 cents.

Fig. 37 shows a driving train from gear 250 to gear 75 on shaft 52 as follows: Gears 250 and 251 having a driving ratio of 2/3; gears 252 and 75 driving through idler 253 have a ratio of 1/2 so that the resulting gear train value is 2/3×1/2 which = 1/3 of the master wheel movement corresponding to 10 cents in value.

In Fig. 38, the resulting gear train value from gears 254 and 255 having a ratio of 5/3 and gears 256 and 81 having a ratio of 1/2, is 5/3×1/2 which = 5/6, corresponding to 25 cents.

In Fig. 39, gears 258 and 87 have a gear ratio of 5/3, corresponding to 50 cents.

In Fig. 40 showing the driving gear train for the control discharge cam, the angular rotation of the gear 116 having one revolution to the angular rotation of the 1/3 segment gear 113 which has 1/3 of a revolution, the resulting train value is as 3 is to 1. For the gears as shown, gears 259 and 260 have a ratio of 3/2; gears 261 and 116 have a ratio of 2/1 with a resulting gear train value of 3/2×2/1 which = 3/1.

In the timing gear driving, Fig. 41, the angular rotation of gear 101 having one revolution to the angular rotation of gears 262 having 1/5 of a revolution requires a gear train value as follows: Gears 262 and 263 have a ratio of 5/2. Gears 264 and 101 have a ratio of 2/1 with a resulting train value of 5/2×2/1=5.

Fig. 42 represents one of the gear trains for the coin expelling mechanism in which the angular rotation of gear 136 having one complete rotation is related to the angular rotation of gear 265 having 1/5 of a revolution caused by the following gear train; gears 265 and 266 have a ratio of 5/2; gears 267 and 136 driving through an idler gear 268 have a ratio of 2/1 resulting in a gear train value of 5/2×2/1=5.

Fig. 43 represents a reversing gear train not shown in Fig. 29 in which the angular rotation of gear 94 on the master wheel shaft 52 has 1/3 of a revolution with respect to the angular rotation of gear 269 which has 1/5 of a revolution resulting in a gear train value of 50/150×5/1 or 5/3. The gears 269 and 94 have a gear ratio of 5/3 with an idler gear 270 to reverse the direction of rotation as indicated by the arrows in this figure.

The pre-setting of the price on the master wheel and the registration of the coins being thus described, the mechanism for disposing an article and the timing gear function and its relationship will next be described:

Referring to Figs. 10 and 29, an indicator 110 relative to a trip dog 111 is mounted on the plate 109 of the master wheel and the registrating of any coin rotates the master wheel 108 in the direction of the arrow as shown. As the units accumulate to the pre-set value, the trip dog 111 contacts spring lever 119 which is pre-set relative to the zero position of the master wheel and such engagement simultaneously actuates relay switches 120 and 121. Relay switch 121 energizes a solenoid 280 of Fig. 44 to deliver an article, a message, or the like, from the vending machine. Relay switch 120 energizes a solenoid 103 (Figs. 20 and 44) causing clutch mechanism 104 of Fig. 1 to engage the intermittent gear 100.

For an angular rotation of 1/5 of a revolution, designated by the double arrow 213 in Fig. 23, the driven timing gear 101 (Fig. 19) having a pin 102 projecting therefrom, is rotated one revolution by the gear train shown in Fig. 41. At the end of one revolution of gear 101, the pin 102 contacts the spring lever 60 to actuate a relay 107, Figs. 19 and 44. This energizes solenoid 105 (Figs. 20 and 44) to disengage clutch mechanism 104 from the clutch position shown in Fig. 24 to the disengaged position shown in Fig. 20.

Simultaneously, with the actuation of solenoid 105, its contact bar 105a engages relay switch 106 (Figs. 20 and 44) which energizes solenoid 137 (Figs. 12 and 44) causing clutch mechanism 138 (Figs. 1 and 12) to engage intermittent gear 135. For 1/5 of a rotation of intermittent gear 135, the gear 136 (Fig. 1) through the gear train of Fig. 42 is rotated one complete revolution for the coin expelling mechanism shown in Figs. 29 and 32.

Because the amount registered and the pre-set unit are equal, the positions of the 1/3 segment gears 112 and 113 will remain as represented and shown in Figs. 29 and 10 which means that the control discharge cam of Fig. 2 is in its zero position. The idler gears of the coin expelling gear trains will be out of mesh, and therefore the driven gear 136 of Fig. 29 completes one revolution as previously described without expelling any coins. Gear 136 completes one revolution as a result of 1/5 of a revolution of the intermittent gear 212 (Fig. 23) and thereafter the clutch mechanism cam has contacted spring lever 60 to actuate relay switch 139 (Figs. 12 and 44), which energizes solenoid 140, disengages clutch mechanism 215, and simultaneously solenoid bar 140a contacts relay switch 141 (Figs. 12 and 44) and energizes solenoid 96 (Fig. 22) of the reversing mechanism, (see also Fig. 24) engaging the clutch 215 of intermittent gear 212 to the gear trains of Fig. 29.

For an angular rotation of 1/5 of a revolution (213 in Fig. 23), gear 94 (Fig. 43) is rotated 1/3 of a revolution. The master wheel 108 now rotates in the reverse direction from the pre-set unit to its normal or zero position in a direction opposite to the arrow as shown in Figs. 29 and 10, roller 204 enters clip lever 122 while roller reverses 1/150 of a revolution beyond the zero position 117 as noted in Fig. 10. Likewise roller 205 on clip lever 124 corresponding to the angular rotation designated 118 also reverses because the reversing of 1/3 of a revolution is not yet complete; that is, if the pre-set position is less than 50 units on the master wheel calibrated face, then the clip lever 122 at approximately an angular rotation designated 117 closes relay switch 123 which energizes solenoid 97 (Fig. 22) disengages clutch mechanism 215 (Fig. 24) shown in disengaged position by Fig. 22, and simultaneously, the solenoid bar 97a of solenoid 97 engages the relay switch 98 (Fig. 22).

Clip levers 122 and 124 return the master wheel 108 and the 1/3 segment gear 113 to their normal or zero position as shown in Fig. 10 with the exception that the indicator 110 is pre-set to some other unit than the position shown. Also, in Fig. 44, relay switch 98 energizes a solenoid 279 closing snap action switch 278, thereby energizing solenoids 274 and 275 simultaneously. Solenoid 274 of the push-pull type releases snap action switch 277 in its normally open position while solenoid 275 when energized depresses the maintained contact switch 276 to its open position, thus opening the entire motor circuit as shown in Fig. 44. This procedure completes the sequence of operation for the amount inserted equal to the pre-set price.

In the case of a change return, that is, where the amount inserted is greater than the pre-set price, then the exception to the sequence of operation, as previously described, is in the controlling of the discharge cams shown in Fig. 2 with respect to the engagement of the 1/3 segment gears 112 and 113 shown in Fig. 29.

The principles embodied in the development of the control discharge cams (Fig. 2) for the cumulative addition in sequence is illustrated in the following tabulation, the cams being designated as 126 to 133 inclusive, and the numbers from 1 to 50 designating the positions of the various cams for discharging the amounts indicated from the various coin receiving chutes. In other words, the cams are all mounted upon the same shaft 125; 126 to 129 for discharging 1 cent, 2 cents, 3 cents, 4 cents individually; 130 for discharging a nickel or 5 cents; 131 for discharging a dime or 10 cents; 132 for discharging two dimes or 20 cents; and 133 for discharging a quarter or 25 cents. For discharging 6 cents, cam 126 and cam 130 will be required. For discharging 17 cents, cam 127, the 2 cent cam, cam 130, the 5 cent cam, and cam 131, the 10 cent cam will be required. Likewise, other combinations of cams will be necessary for discharging the amounts from 1 to 49 cents may be determined from the chart given below:

| Cams | | 126 | 127 | 128 | 129 |
|---|---|---|---|---|---|
|  |  | 0 | 1 | 2 | 3 | 4 |
| 130 |  | 5 | 6 | 7 | 8 | 9 |
| 131 |  | 10 | 11 | 12 | 13 | 14 |
| 130 and 131 |  | 15 | 16 | 17 | 18 | 19 |
| 132 |  | 20 | 21 | 22 | 23 | 24 |
| 133 |  | 25 | 26 | 27 | 28 | 29 |
| 130 and 133 |  | 30 | 31 | 32 | 33 | 34 |
| 131 and 133 |  | 35 | 36 | 37 | 38 | 39 |
| 130, 131 and 133 |  | 40 | 41 | 42 | 43 | 44 |
| 132 and 133 |  | 45 | 46 | 47 | 48 | 49 |

The cams 126 to 133 will have the following relationship with the gear train expelling mechanism as shown in Figs. 1, 29, 30, 31, 32 and 34 as follows:

For that angle of rotation of gear 135 designated as 50 in Fig. 11, gear 136 is rotated one complete revolution through the connected gear train. A coin is expelled from the bottom of tube 177 by a cam follower rod 173 through the action of cam 161 when an idler gear 166 is in mesh with gears 145 and 153 having a ratio of 1/1. This gear 136 is mounted at the end of a lever 164 pivoted about a bolt 165 having a roller 168 which enters into the spaced grooves of the 1 cent cam 126 whenever that cam is moved around to register with the position of the roller 168, the roller being urged into the cam notch by the spring 167 at the other end of the lever, thereby meshing the idler gear 166 with the gears 145 and 153. In a similar manner, the other cams 127 to 133 are engaged by cam follower rollers mounted upon levers for actuating idler gears and producing the following gear ratios for the respective cams:

126 meshes gears 145 and 153 at gear ratio 1:1
127 meshes gears 146 and 154 at gear ratio 1:2
128 meshes gears 147 and 155 at gear ratio 1:3
129 meshes gears 148 and 157 at gear ratio 1:4
130 meshes gears 149 and 158 at gear ratio 1:1
131 meshes gears 143 and 151 at gear ratio 1:1
132 meshes gears 144 and 152 at gear ratio 1:2
133 meshes gears 150 and 159 at gear ratio 1:1

The control discharge cams of Fig. 2 show a notch or notches formed around the periphery of the cams which determines the discharge of the coin or coins through the above described movement of the expelling gear mechanism or mechanisms, the combination of the gears as shown in the chart above being located at the zero or 50 position to produce the operation of the expelling mechanism or mechanisms to eject the predetermined amounts.

In Figs. 11, 13, and 14, the rotation of the cam 126 in the direction of the arrow causes the follower roller 168 attached to an adaptor 169 and the fixed lever 164 to roll along the cam contour and at each notch interval, the roller 168 is engaged or dwells instantaneously in the groove by the action of the tension spring 167. This compresses a shock absorber spring 171 attached to the roller follower 170 and idler gear 166 attached to the lever 164 is moved into mesh with the set gears 145 and 153. At the next interval, the roller 168 is forced out of the notch due to the cam rotation and by the movement of the lever, the idler gear is thrown out of mesh with the gears 145 and 153. As long as the roller remains in the cam, notch or grooves, the idler gear is in mesh with the other gears. In Figs. 29 and 34 are shown cam roller follower modifications of the construction shown in Fig. 11. In this arrangement, the rotation of cam 126 causes the roller 168 to enter into the cam notches by the pressure of spring 221 and to eliminate any surging effects, the spring adjustment adaptor 219 carrying a roller idler gear adaptor 222 and a radial ball bearing adaptor 223 which is fixed to a central discharge cam hub and causing a similar sequence of instantaneous motion as described in the preceding paragraph.

The rotation of the master wheel 108 with the dog 111 trips the pre-set lever 119 (see Fig. 10) to actuate the dispensing movement of an article relay switch 121 and the timer relay switch to set the timing gear in motion in a predetermined time interval. Since the master wheel is to rotate beyond the pre-set unit, an amount dependent upon the amount inserted but greater than the pre-set unit, the 1/3 segment gears 112 and 113 mesh in engagement at the pre-set unit and rotate relative to the master wheel transmitting this motion through the gear train of Fig. 40 to the control discharge cams (Fig. 29). The driven segment gear 113 having a 1/3 rotation drives through the gear train to cam driver gear 116 (Fig. 40) imparting one revolution thereto. The gear 116 is driven at a gear ratio of 3:1 by the driving gear 259.

The control discharge cams are now rotating with the follower rollers into and out of the notches or grooves corresponding to the idler gear, in and out of mesh with the set gears instantaneously as described. At some unit greater than the pre-set value, the master wheel has come to a stop and likewise the control discharge cams and come to a stop registering the difference in change return. At this point, the cam follower rollers that are in the cam grooves corresponding to the idler gear or gears and mesh with the set gears remain in this position until the coin expelling gear mechanism comes into action.

The master wheel stop precedes that of the timing gear in engaging the coin discharge clutch mechanism and mention has been made of the predetermined time interval of the timing gear cycle of actuation. At the end of the timing gear interval, relay switch 107 (Fig. 44) is actuated, energizing solenoid 105 which disengages clutch mechanism 215 (Fig. 24) and simultaneously actuates relay switch 106 energizing solenoid 137 to engage the clutch mechanism 215 with the intermittent gear 212 (Fig. 24) of the coin discharge mechanism (Fig. 29) through the gear train of Fig. 42. The driving gear 265 of the intermittent gear 212 rotates 1/5 of a rotation while the driven gear 136 completes one rotation or a gear ratio of driven to driver of 5:1 described in the detail description of Fig. 42.

The coin discharge clutch mechanism being engaged and rotated, transmits this motion to gear 136 to drive the set of gears by means of the idler gear of the cam follower roller combination in mesh as depending on the gear ratio to expel the coin out of the accumulator tubes to the receiving receptacle.

Having completed the discharge of the coin change return, the discharge clutch mechanism 215 (of Fig. 24) at the end of 1/5 of a rotation, actuates relay switch 139 to energize solenoid 140 disengaging clutch mechanism 215 and simultaneously actuates relay 141 (Fig. 44) to energize solenoid 96 engaging the clutch mechanism 215 of the reversing mechanism and gear train of Fig. 43.

The reversing gear mechanism in engagement rotates the master wheel in a reverse direction, dog 111 (Fig. 10) contacts pre-set lever 119 free to turn about its pivot pin until rollers 204 and 205 enter clip levers 122 and 124 respectively. The master wheel reverses beyond its normal position by approximately an angular amount 117 when the clip lever 122 actuates relay switch 123 to disengage reversing gear clutch mechanism 215 (Fig. 24) and simultaneously actuates relay switch 98 of Fig. 44. Switch 98 energizes solenoid 279 operating its snap action switch to close a circuit which in turn energizes solenoids 274 and 275, simultaneously opening the entire motor circuit. This completes the sequence of operation for the change return.

The cycle for a pre-set price of a 7 cent article, and the like, to be bought, will now be described to give the general summary of operation and the results obtained as follows:

In Figs. 10 and 29, the master wheel 1/3 segment indicator 110 is pre-set at a unit of 7 on the calibrated faces of the master wheel, is locked in this position, and the spring lever 119 is the pre-set position for corresponding to the zero position of the master wheel 108. A coin or coins of different denominations are inserted through the single slot admission hole 187 (Fig. 3) equal to the pre-set price, or greater than the pre-set price. Coins equal to the pre-set price may have these combinations: One nickel and two pennies, or seven pennies. A coin greater than the pre-set price may be one dime, one quarter, or half-a-dollar.

Considering the combination of one nickel and two pennies, the order of insertion one at a time may be in any order. If we assume that the order is one penny, one nickel and one penny, the first penny depresses a maintained contact switch button 276 (Fig. 44) energizes solenoid 274 closing snap action switch 277 and closing the operating circuit through the motor 273. The motor shaft 51 (Fig. 1) is rotated. thereby causing movement of the intermittent gears thereon, alternately in engagement and in a period of rest, but no motion is transmitted to the master wheel shaft 52 since no clutch mechanism has been actuated for engagement with its intermittent gear.

The first penny rolling on the inclined angle plate 185 is deflected by vane and stopper 191 into the perforated hole 196 through guide adaptor 198 upon a lever 183 which closes a switch 184 as the coin is accumulated into the tube 177.

As shown in Fig. 44, switch 184 energizes solenoid 56 releasing clutch mechanism into engagement and to rotate master wheel one unit. At the end of 1/5 of a rotation of the intermittent gear, the clutch mechanism cam actuates relay switch 61 energizes solenoid 62 disengaging the clutch mechanism 215 (Fig. 24).

The 5 cent piece following the penny also actuates a relay 284 in the 5 cent tube in a similar manner energizes its solenoid 71 to release clutch mechanism into engagement with its intermittent gear registering 5 units more on the master wheel, totalling six units. At the end of 1/5 of a rotation of its intermittent gear, the clutch mechanism cam actuates relay switch 281 energizing solenoid 72 to disengage the clutch mechanism for the 5 cent denomination. The one penny following the nickel, actuates relay switch 184 in a manner as already described, energizing solenoid 56 to place its clutch mechanism in engagement with its intermittent gear, registering one more unit or a total of 7 units on the master wheel. At the end of 1/5 of a rotation of the intermittent gear for the 1 cent, its clutch mechanism cam actuates relay switch 61, energizes the solenoid 62 to disengage the set clutch mechanism.

As seven units are registered on the master wheel, the 1/3 segment gear 112 (Fig. 10) is in engagement with the 1/3 segment gear 113 corresponding to the position in which the dog 111 trips the pre-set lever 119 to actuate the delivery relay switch 121 and the timing gear relay switch 120 bringing the master wheel to a stop. Switch 121 energizes solenoid 280 to dispense an article, a message, or the like, while the switch 120 energizes solenoid 103 to release its clutch mechanism in engagement with its intermittent gear (Fig. 44). Within the limits of prescribed time intervals of the timing gear 101 (Fig. 41) pin 102 actuates relay switch 107 (Fig. 44) energizing solenoid 105 to disengage its clutch mechanism and simultaneously actuating relay switch 106. Switch 106 in turn energizes solenoid 137 to release the coin discharge mechanism into engagement with its intermittent gear transmitting this motion to the coin expelling gear mechanism (Fig. 29). Since the control discharge cams of Fig. 2 are in their normal or zero position with respect to the 1/3 segment gears, the idler gears of the cam follower rollers are all out of mesh with the set gears of the expelling mechanism and no motion is transmitted to the corresponding expelling gear mechanism. Gear 136 (Fig. 29) having completed one complete rotation relative to the 1/5 rotation of its intermittent gear, its clutch mechanism cam actuates relay switch 139 (Fig. 44) which energizes solenoid 140 to disengage the clutch mechanism and simultaneously actuates relay switch 141. This switch energizes solenoid 96 of the reversing mechanism to engage its clutch mechanism with the intermittent gear, thus reversing the direction of the master wheel rotation to its normal or zero position.

The rollers 204 and 205 (Figs. 10 and 29) enter clip levers 122 and 124 respectively while the master wheel is still reversing, but approximately at the angular rotation amounts 117 and 118 respectively. Clip lever 122 contacts relay switch 123 energizing solenoid 97 (Fig. 44) to disengage its clutch mechanism which simultaneously actuates relay switch 98. The master wheel by the action of self-centering clip lever 122 is returned to its normal or zero position. With a similar action, self-centering clip lever 124 brings its segment gear 113 to its normal or zero position.

The relay switch 98 as shown in Fig. 44 energizes solenoid 279 closing the snap action switch 278 thereby energizing solenoids 274 and 275 to open the entire motor circuit simultaneously.

For the same pre-set price of 7 cents, but inserting a coin greater than the pre-set price, for example, half-a-dollar, through the single admission slot as previously described, closing relay switch 287 (Fig. 44) as the coin falls through the accumulator tube 181 (Fig. 3) into the accumulator box located below the tubes. Relay switch 287 energizes solenoid 89 to release its clutch mechanism for engaging its intermittent gear registering 50 units on the master wheel. Before registering the 50 units, but at the pre-set price, dog 111 (Fig. 10) trips lever 119 to actuate timing gear relay switch 120 and delivery relay switch 121. With the 1/3 segment gears 112 and 113 in engagement, all simultaneously as described in the previous example, with the exception that the master wheel advances to register 43 more units relative to the movement of the 1/3 segment gears. This movement of the 1/3 segment gears rotates the control discharge cams (Fig. 2 and Fig. 29) while the cam follower rollers instantaneously enter in and out of the cam notches corresponding to the cam follower roller idler gears, thereby engaging and disengaging set gears of the coin expelling gear mechanism until the master wheel has come to a stop in registering the 50 units. Stopping of the master wheel simultaneously stops the rotation of the control discharge cams in such position that the cam follower rollers and the idler gears are in the cam notches and in engagement with set gears respectively registering the differences for the change return of 43 cents.

The differences for 43 cents are best illustrated in Figs. 1 and 2 where the result obtained is as follows:

Cam 128 for discharge three single pennies has an idler gear which meshes gears 147 and 155 with a gear ratio of 1:3; cam 130 for one nickel, has an idler gear engaging gears 149 and 158 with a gear ratio of 1:1; cam 131 for one dime, has an idler gear engaging gears 143 and 151 with a gear ratio of 1:1; and cam 133 for one quarter, has an idler gear engaging gears 150 and 159 with a gear ratio of 1:1.

The timing gear mechanism at the end of the pre-determined time interval actuates relay switch 107 (Fig. 44) to disengage its clutch mechanism simultaneously actuating relay switch 106 thereby energizing solenoid 137 to release its coin discharge clutch mechanism to engage it with its intermittent gear transmitting this motion to the coin expelling gear mechanism (Figs. 29, 31, 32 and 33). The expeller 230 (Fig. 32) through the expeller gear mechanism discharges coins out of the accumulator tubes (Fig. 1) as follows:

Three pennies out of tube 177;
One nickel out of tube 178;
One dime out of tube 176; and
One quarter out of tube 179

Thus a total of 43 cents is discharged into the gravity discharge chute into the receiver of Fig. 6.

At the end of the coin expelling cycle, relay switch 139 (Fig. 44) is actuated by its discharge cam to clutch mechanism to energize solenoid 140, thereby disengaging the discharge clutch mechanism and simultaneously operating relay switch 141. This switch energizes solenoid 96 to release the reversing clutch mechanism for engagement with its intermittent gear, thereby returning the master wheel to its normal or zero position.

In the reverse rotation of the master wheel, dog 111 contacts the pre-set lever 119 and turns about its pivot against the tension of its spring and after passing the lever 19 is returned to its normal position by the action of the spring, rollers 204 and 205 enter clip levers 122 and 124 respectively at the zero or normal position of the master wheel. The reversing gear ratio is 5:3 and so the master wheel reverses 50 units. The reversing intermittent gear is now in its rest period and then engages to continue reversing rotation of an additional 50 units. As the master wheel rotates in reversing direction an angular amount of 117 relative to the 1/3 segment gear 113, angular rotational amount of 118, the master wheel roller 204 turns the self-centering clip lever 122 to actuate its relay switch 123.

Relay switch 123 (Fig. 44) energizes solenoid 97 to disengage its reversing clutch mechanism and to simultaneously actuate relay switch 98. In so doing, the self-centering clip levers 122 and 124 bring the master wheel and the 1/3 segment gear 113 respectively to their normal or zero positions.

Relay switch 98 energizes solenoid 279 closing snap action switch 278, thereby energizing solenoids 274 and 275 to open the motor circuit simultaneously as shown and previously described.

Thus the system is returned to normal or zero position ready for the insertion of another coin or coins which are first recorded in amount on the master wheel, then the article or message is delivered, and if any change is to be returned, it is discharged as described.

The master wheel may be connected to a counter which will register the total amount inserted and the discharging mechanism may be connected to a counter which registers the number of times the system is operated or the number of articles dispensed, and various other counters and mechanism may be applied to the change making machine for recording and registering which constitute no novel part of the present invention.

It is also apparent that all of the mechanism will be housed in a suitable container which preferably conceals all but the single coin admission chute, the article dispenser and the change dispenser. The particular form of the cabinet or container forms no particular part of the present invention.

A more practical means of engaging and disengaging the expeller gears for discharging coins from the coin chutes are shown in Figs. 46, 48, 49 and 52 using gear clutch mechanism as shown and described in connection with the other gear clutch mechanisms. One method is illustrated by Figs. 48 and 49 and the other method is illustrated by Figs. 51 and 52. Either one of these methods is applicable in controlling the discharge of the coins from the accumulator tubes.

The driven gears of the various sets of different gear ratios are mounted by press fitting or otherwise securing them to their respective saw tooth clutch adaptors and are press fitted on to the radial ball bearings, and the radial ball bearings are press fitted on to the shafts as shown in Figs. 46, 48 and 52. The other halves of the mating portions of the saw tooth clutch and adapter consists of serrated shaft perforations fitted on to serrated shafts with a sliding fit.

Referring to Figs. 48 and 49, the control discharge cam 127 is engaging roller 317 and its adaptor 316, clip levers 308 are pivoted on support 319 with their ball retainer attachments, drawn together by tension spring 318, operated by roller 315 for engaging gear 154 (or 152) which is press fitted or brazed on to clutch hub 304 similar to the corresponding parts as shown in Figs. 28 and 29. The clutch 304 is press fitted on to bearing 314, the bearing 314 being in turn, press-fitted on the shaft 312 and spring 311 holds another clutch element 303 in disengaged position, the hub of clutch 303 has a serrated hole which is free to slide on the serrated shaft portion 312a. A thrust washer 305 is press fitted on clutch hub 303 while a thrust washer 306 has a sliding fit on the clutch hub 303, and a washer 307 is press fitted on the shaft 312 as shown, all of these parts showing the mechanism in a disengaged position.

Gear 154 (or 152) and the clutch 304 are free to rotate on bearings 314 without causing the rotation of the shaft 312 in this disengaged position.

The control discharge cam 127 rotating in the direction of the arrow as shown, causes the roller 317 to dwell intermittently in the cam notches or groove, and the action of the compressed spring 320 forces a roller follower adaptor 316 to travel downwardly in the direction of the arrow adjacent the number 316 as the roller 317 enters the cam groove and while the clip lever rollers 315 are forced out of adaptor groove 316a and rolls on to the surface 316b of adaptor 316 which is guided by supporting members 319 and 322. The spring 318 assists the clip levers 308 in their clamping movement which are pivoted upon the supporting member 319 and have the ball bearing retainer attachment resting in a V-groove periphery between thrust washers 305 and 306. This causes a wedging action between the face of the thrust washers 305 and 306, forcing the clutch 303 to slide axially on the serrated shaft 312a, compressing spring 311, and into engagement with saw tooth clutch 304. Rotation of gear 154 (or 152) causes the shaft 312 to rotate while the gear 225 by virtue of being fixed to the shaft 312 transmit rotary motion to the coin expeller arm as shown in Fig. 32.

A roller 317 is forced out of the cam groove by the rotation of cam 127 so that it rests on the periphery of the cam and in so doing, roller 315 moving on surfaces 316b enters the grooves 316a, forcing clip levers 308 and their ball retainers out of and free from the faces of thrust washers 305 and 306 extending spring 318, while the spring 311 forces the clutch 303 to slide axially on serrated shaft 312a to its disengaged position as shown in Figs. 48 and 49.

Figs. 51 and 52 show a modified method of engaging and disengaging the clutch mechanism for expelling coins from the accumulator tubes by utilizing a solenoid and a limited switch combination. The method is similar to that previously described with the exception of a ball bearing 309 and its collar 309a attached to a solenoid shaft 325a replacing thrust washers 305 and 306 and clip levers 308.

A spring operated switch 326 with a roller operating attachment 327 engaging the periphery of cam 129 replaces the adaptor 316 and the roller guide adaptors 322 and 323 of Figs. 48 and 49. The rotation of cam 129 in the direction of the arrow as shown causes the limit switch operating roller 327 to enter the cam groove by spring action, closing switch contacts to energize solenoid 325, the clutch 303 slides axially on serrated shaft 312a compressing spring 311 to engage saw tooth clutch 304. The rotation of gear 157 then transmits rotary motion to shaft 312 as previously described.

When the roller 327 is forced out of the cam groove on to the periphery of cam 129, the switch 326 opens the electrical circuit, deenergizing solenoid 325 while spring 311 now compressed expands axially causing clutch 303 to slide on serrated shaft 312a into its disengaged position as shown in Fig. 52. Either of these two methods can be utilized for the expeller gear mechanism for the various coin expeller gears and may be substituted for the mechanism above described. It is also noted that the control discharge cams of Fig. 2 having notches or grooves may be provided with similar outwardly turned projections instead of the grooves for operating the switches 326 by means of contact rollers 327 as shown in Fig. 51.

While various parts of this change making machine have been described in detail, these constructions should be regarded as an exemplification of the invention and not as a limitation thereof, since various changes in the construction, combination and arrangement of the several parts may be made without departing from the spirit and scope of the invention.

We claim:

1. In a change making machine, the combination of a rotatable master wheel for registering the values of all inserted coins, a master wheel segment gear movable for pre-setting prices upon the master wheel an amount to be received as a payment, a motor driven shaft actuated when a coin is received by the machine, clutch mechanisms responsive to the inserted coin for connecting the motor to the master wheel to actuate the master wheel an amount determined by coins inserted so as to rotate the segment gear in a direction reverse to the presetting direction, means actuated by the master wheel to deliver an article when the pre-set amount is registered by the master wheel, notched cam discs operated by the master wheel for any over-payment, gear means operated by said segment gear upon said reverse movement thereof to select a combination of said cams to correspond to an amount by which the inserted coins exceed the pre-set price, gear means selectively placed in mesh by said selected cam combination, and clutch means operated in response to said reverse movement of said segment gear for actuating said last mentioned gear means, and coin ejecting means operated thereby for ejecting the proper coins for any inserted payment exceeding the pre-set amount.

2. In a change making machine, according to claim 1, the plurality of notched cam discs forming a combined sequence for the cumulative addition of any over-payment in the difference between the inserted amount and the pre-set amount from 1¢ to 49¢ in combination with gear ratio means for ejecting one or more coins by the rotary movement of the cam discs.

3. In a change making machine, in accordance with claim 2, the combination of trip devices and delivery and timing switches actuated thereby for discharging the change making coins, timing clutch mechanism and ejector clutch mechanism operated thereby, and reversing clutch mechanism actuated by the ejector clutch mechanism operative to return the master wheel to its normal zero operating position.

4. In a change making machine, in accordance with claim 3, a single motor means for driving the master wheel, the timing clutch mechanism, the ejector clutch mechanism and the reversing clutch mechanism in combination with electrical actuating means for each of the said clutch mechanisms.

5. In a change making machine, in accordance with claim 1, an electrical switch and an intermittent clutch cam driven by the master wheel having clutch means to actuate the switch in combination with a solenoid to disengage the clutch and actuating the switch to set up the stated sequence of operations.

6. In a change making machine, according to claim 1, the notched cam discs having cam follower rollers engaging in the notched cam grooves, idler gear clutch mechanism simultaneously actuated by the said clutch means, and gear ratio means set in motion by the idler gear clutch mechanism for ejecting the proper coins for any inserted payment exceeding the pre-set amount.

NICHOLAS N. ARASHIRO.
FRED R. HAMAISHI.

References Cited in the file of this patent

UNITED STATES PATENTS

| Number | Name | Date |
|---|---|---|
| 1,172,195 | Carter et al. | Feb. 15, 1916 |
| 2,073,870 | Johns | Mar. 16, 1937 |
| 2,083,947 | Furber | June 15, 1937 |
| 2,323,255 | Sutherland | June 29, 1943 |
| 2,354,896 | Weiler | Aug. 1, 1944 |
| 2,526,749 | Hokanson | Oct. 24, 1950 |

FOREIGN PATENTS

| Number | Country | Date |
|---|---|---|
| 403,366 | Great Britain | of 1933 |